Figure 1:
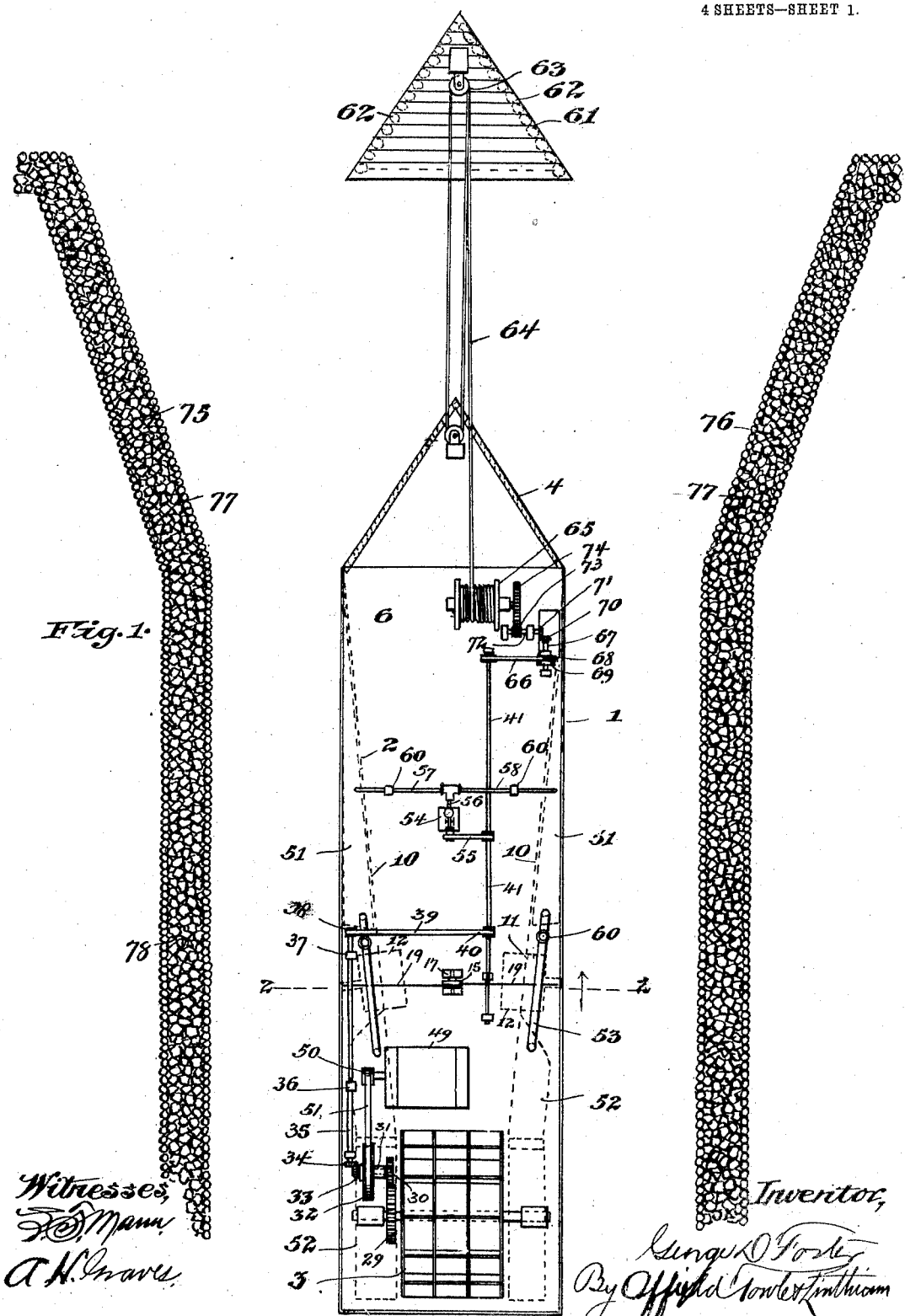

No. 780,275. PATENTED JAN. 17, 1905.
G. D. FOSTER.
CURRENT MOTOR.
APPLICATION FILED NOV. 30, 1903.

4 SHEETS—SHEET 1.

Witnesses,
F. S. Mann
A. W. Graves

Inventor,
George D. Foster
By Offield Towle Linthicum
attys.

No. 780,275. PATENTED JAN. 17, 1905.
G. D. FOSTER.
CURRENT MOTOR.
APPLICATION FILED NOV. 30, 1903.
4 SHEETS—SHEET 2.
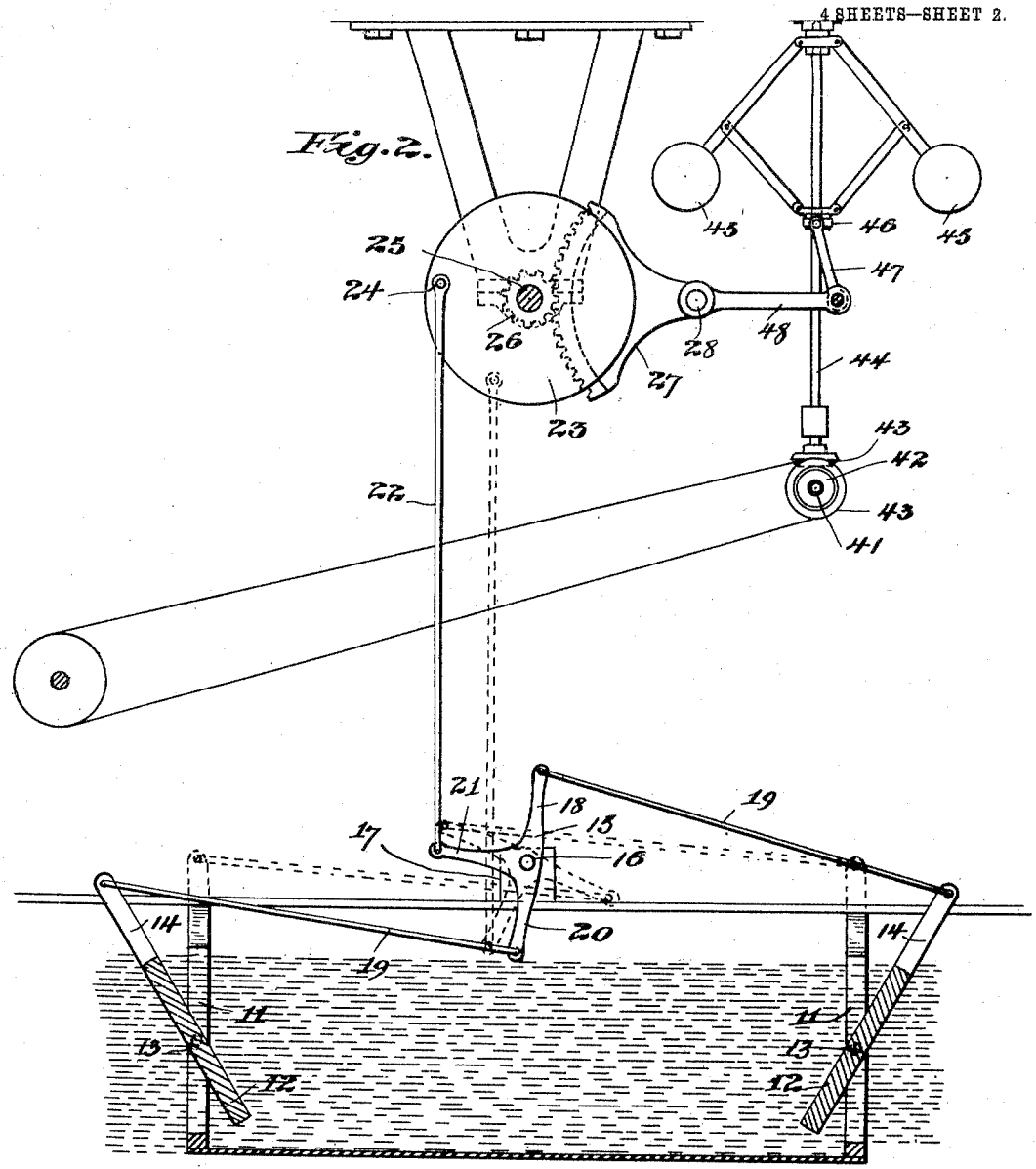
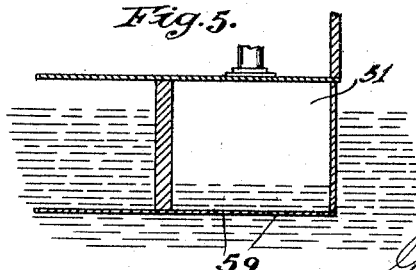

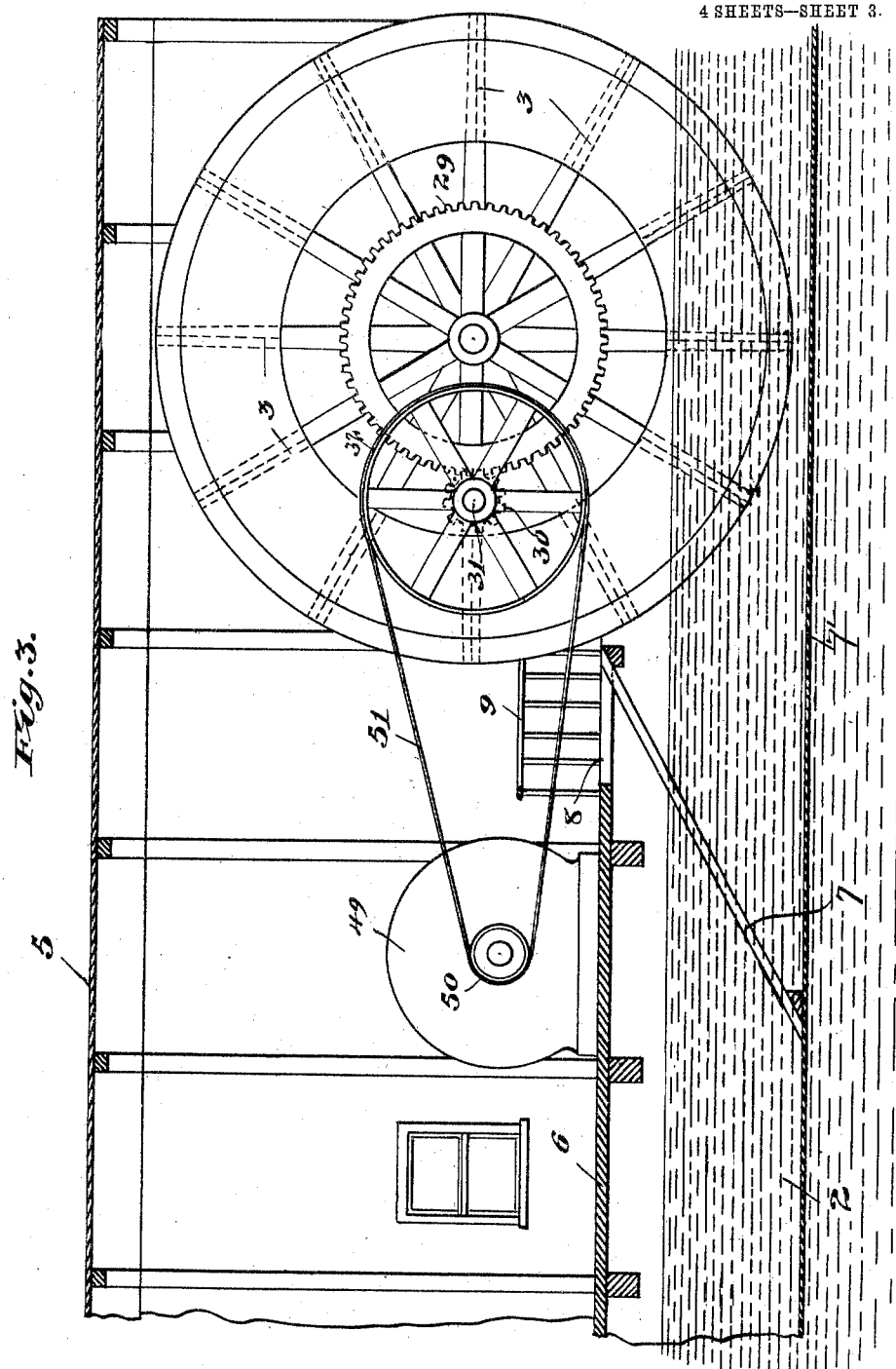

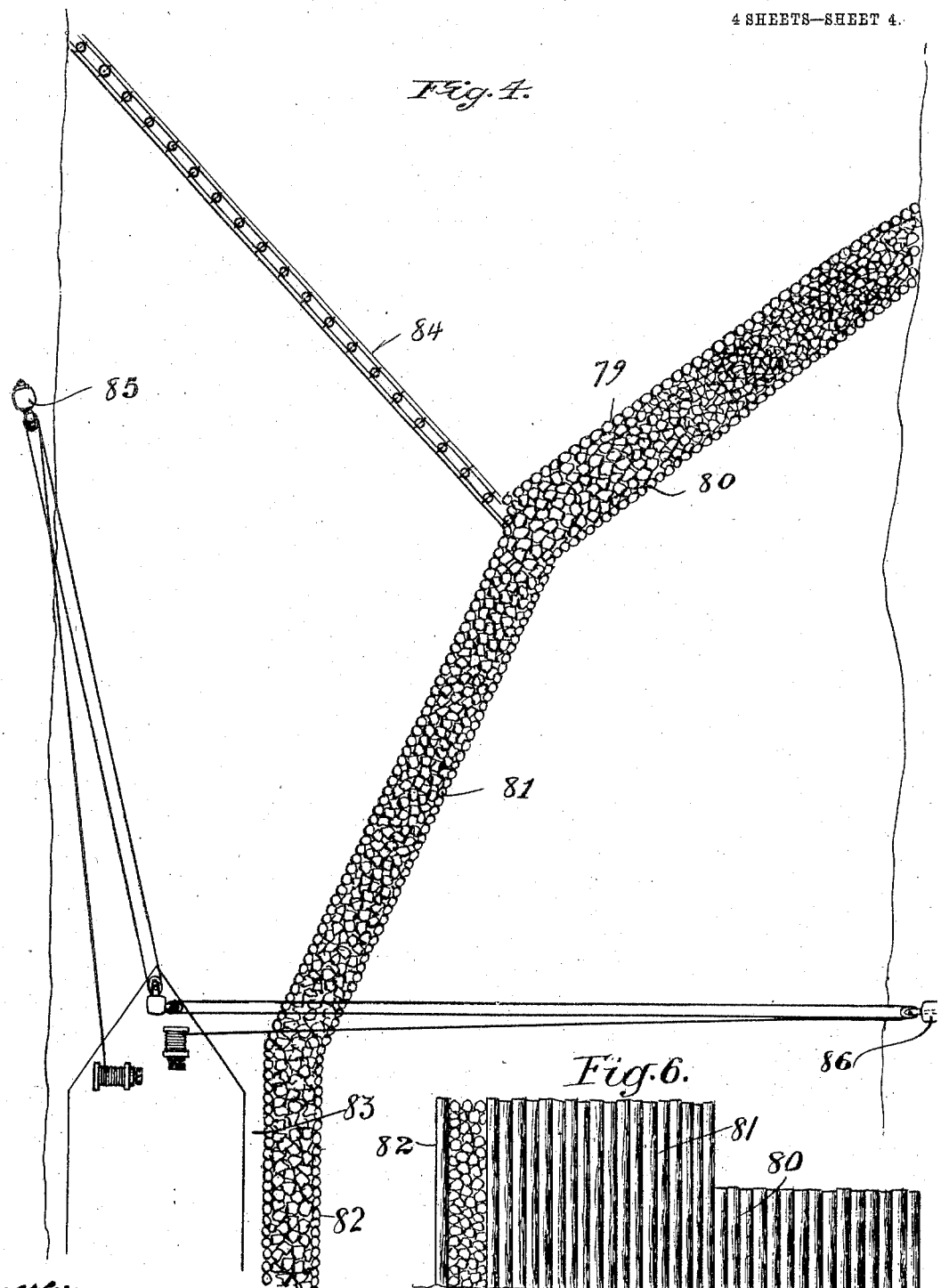

No. 780,275. Patented January 17, 1905.

UNITED STATES PATENT OFFICE.

GEORGE D. FOSTER, OF PRESTON, IOWA.

CURRENT-MOTOR.

SPECIFICATION forming part of Letters Patent No. 780,275, dated January 17, 1905.

Application filed November 30, 1903. Serial No. 183,184.

*To all whom it may concern:*

Be it known that I, GEORGE D. FOSTER, a resident of Preston, in the county of Jackson and State of Iowa, have invented certain new and useful Improvements in Current-Motors, of which the following is a specification.

This invention relates to improvements in water-motors, and refers more specifically to a current-motor of that type in which the water-wheel is supported in a floating frame, as distinguished from being mounted in a stationary structure.

Among the salient objects of the present invention are to provide a construction in which a water-wheel mounted in a floating frame is combined with a downwardly-converging flume forming a part of the floating structure in such manner as to secure greater power than could be secured without the use of the converging flume; to provide a construction in which the volume of water delivered to the wheel may be regulated and the regulation accomplished automatically, thereby affording an approximately uniform amount of power independently of fluctuations in the stream and its rate of flow; to provide a construction in which the regulation above referred to is accomplished by moving one or more gates controlling spillways, whereby as the volume and speed of the current increase less water is delivered to the wheel, and, vice versa, as the current and volume decrease more water is directed to the wheel; to provide a construction in which the entire motor mechanism is mounted upon a single floating structure, and this floating support is provided with air-chambers into which air may be forced under pressure or allowed to escape, and the position of the structure as a whole relatively to the surface of the water controlled accordingly; to provide in a construction of the general character described mechanism for varying the floating depth, which mechanism is arranged to be actuated directly from the water-wheel; to provide in conjunction with a motor of the general character described wing-dams for utilizing the greater part of the entire volume of water of the stream at such times as the stream is abnormally low, and at the same time to provide such a construction that during normal or high water the surplus water may readily pass without changing or adjusting the controlling wing-dams; to provide in conjunction with the motor a combined anchor and protecting abutment, which under normal conditions serves as a support for holding the motor in proper position in the stream and which will serve to protect the motor against floating ice and the like when the motor is out of use and drawn up closely behind the abutment; to provide improved details of construction and arrangement whereby a dynamo or other power-converter may be mounted upon the floating structure and driven from the water-wheel, and in general to provide improvements in the details of construction and arrangement of a mechanism of the character referred to.

The invention consists in the matters hereinafter described, and more particularly pointed out in the appended claims, and will be readily understood from the following description, reference being had to the accompanying drawings, in which—

Figure 1 is a plan view showing the general arrangement of the motor, the wing-dams, and the anchor-abutment with superstructure omitted. Fig. 2 is a sectional detail taken approximately on line 2 2 of Fig. 1 and looking in the direction of the arrows. Fig. 3 is a longitudinal vertical section view taken adjacent to one end of the water-wheel and showing the construction and arrangement of the latter and contiguous parts. Fig. 4 is a plan view similar to Fig. 1, showing a modified construction. Fig. 5 is a sectional detail through one of the air-chambers. Fig. 6 is a rear elevation of a portion of the dam looking upstream, showing the varying heights thereof.

Referring to the drawings, 1 designates as a whole a floating frame which takes the form of an elongated open-ended housing, in the lower part of which is formed a downwardly-converging (considered with reference to the direction of the stream) flume 2, in the lower end of which is suspended an ordinary undershot water-wheel 3. The inlet end of the housing is provided with a V-shaped guard 4 pointing upstream and conveniently made of narrow vertically-disposed bars, which prevent the entrance of floating obstructions, while interfering to a minimum with the flow of the current. The upper side of the housing is closed throughout its length, as indicated at 5, Fig. 3, and at a point somewhat above the normal level of the water a working floor 6 is provided, which terminates a short distance above the water-wheel 3. Preferably a second guard 7 is arranged to extend across the flume just above the water-wheel, this guard consisting of a series of inclined bars extending from the working floor obliquely to and resting upon the lower floor or bottom 7', and which serve to catch and arrest any obstruction which may have passed through the upper guard 4 or may have fallen into the flume from the working chamber above the working floor 6. To facilitate the removal of obstructions arrested by the guard 7, a manhole 8 is provided in the working floor, which manhole is desirably surrounded by a railing 9.

At laterally opposite points in the converging sides 10 10 of the flume are formed openings or spillways 11, which spillways are controlled by gates 12, movably mounted, so as to be capable of tilting from a vertical or closed position into an approximately horizontal or open position, as clearly shown in Fig. 2. Preferably the gates 12 are mounted on horizontally-disposed axes 13, located midway of the width of the spillways 11, and each gate 12 is provided with an upwardly-extending arm 14, operatively connected with automatic governing mechanism now to be described. To this end an oscillatory lever or walking-beam 15 is pivotally mounted, as indicated at 16, upon a suitable bearing-support 17 at a point midway between the gates 12. The lever 15 is of approximately T shape considered as a whole, one of its arms 18 being connected by means of a link 19 with one of the gates, while its oppositely-disposed arm 20 is similarly connected by means of a link 19 with the other gate. With the third arm 21 is connected an actuating-rod 22, which extends to and is connected with a pitman-wrist 24 upon a rocking disk 23. The disk 23 is mounted upon a shaft 25, suitably supported from the superstructure of the housing, as indicated in Fig. 2.

26 designates a spur-gear mounted rigidly and concentrically with the disk 23, and 27 designates a segment arranged to mesh with the spur-gear and pivotally supported upon a stub-shaft 28, which is likewise mounted upon the superstructure of the housing. The segment 27 is actuated by means of a governor of the ordinary centrifugal ball type. The water-wheel is provided with a main gear 29, (see Fig. 3,) which intermeshes with a spur-gear 30, mounted upon a counter-shaft 31. The counter-shaft is provided with a main drive-pulley 32, the function of which will be hereinafter described, and is also extended beyond said drive-pulley and provided with a bevel-gear 33, which is arranged to mesh with a corresponding bevel-gear 34, mounted upon a longitudinally-extending shaft 35. The shaft 35 is journaled in suitable bearings 36 and 37 and is provided at its upstream end with a drive-pulley 38, which is connected by means of a belt 39 with another drive-pulley 40, mounted upon the shaft 41, which actuates the governor. To this end the shaft 41 is provided with a bevel-gear 42, which intermeshes with a corresponding miter-gear 43 upon the lower end of the vertical shaft 44 of the governor. The ball-governor is of a usual type, being provided with the usual centrifugal balls 45 and operated links connected therewith and arranged to actuate a slide-collar 46, mounted upon its main shaft 44. With the collar 46 is mounted a link 47, which is in turn connected at its lower end with an arm 48, rigid with and forming an extension of the segment 27.

The construction and arrangement of the governor mechanism as a whole is such that as the speed of the water-wheel increases the segment 27 is oscillated in the proper direction to open the gates controlling the spillways more or less, and thus reduce the volume of water passing under the wheel and correspondingly reduce its speed. Contrariwise, as the speed of the water-wheel decreases the governor automatically closes the gates, and thus tends to maintain a uniform rate of revolution of the water-wheel.

The water-wheel is in the present instance shown as constructed to drive a dynamo, designated as a whole 49 and mounted upon the working floor, as best seen in Fig. 3. The dynamo is provided with the usual belt-pulley 50, which is driven by means of a belt 51, connecting it with the main drive-pulley 32, hereinbefore referred to.

As an important feature of the present invention I provide means for raising and lowering the motor structure as a whole relatively to the water-level, thereby providing means both for determining the volume of water admitted to the flume and also for raising the wheel out of the water, or at least high enough to render it inoperative. To this end I so construct the housing as to provide air-chambers in each side thereof, as indicated in dotted lines at 51 and 52. These chambers are conveniently formed by hermetically inclosing the spaces between the converging sides 10 of the flume and the outer walls of the housing, the upper sides of said air-chambers being formed by the working floor 6. Two separate chambers 51 and 52 are provided at each side of the housing, the air-chambers being interrupted by the said spillway-openings, which of course open through to the exterior of the housing as clearly shown in the drawings. Each front and rear pair of chambers is connected by means of an air-pipe, as indicated at 53, so that all of the chambers may be filled with air from a common source of supply. In order to fill said chambers with compressed air, and thus expel the water therefrom and raise the structure as a whole, an air-pump 54 is provided, which is conveniently mounted upon the working floor 6 and driven from the shaft 41 by means of belt and pulley connections, as indicated at 55. An air-pipe 56 communicates with the delivery side of the pump, and from this pipe 56 two branch pipes 57 and 58 lead to the air-chambers 51 at the respective sides of the housing and delivered into the upper sides thereof. Suitable discharge-openings 59 will be provided in the lower sides of the air-chambers, through which the water may be admitted and expelled. The pipes 53, 57, and 58 are severally provided with valves 60. It will be obvious that by properly manipulating the valves in the pipes 53 the structure as a whole may be canted, so as to raise or lower its receiving end at will.

As another feature of the present invention I provide an anchoring-abutment 61, which serves to anchor the floating motor mechanism and is so shaped as to protect the entrance end of the latter against floating ice or other obstacles. To this end the abutment is made in the form of two converging wings 62 or is of inverted-V shape in horizontal section, the point of the V being directed upstream. The space between the converging wings is open, so that the point of the housing may be drawn therein, and for this purpose a pulley-block 63 is secured at the inner upper angle of the abutment and connected with the housing by means of a cable 64. One end of the cable extends back and is connected with a windlass mechanism, designated as a whole 65 and mounted upon the working floor of the housing. This windlass mechanism is shown as conveniently driven by means of a gearing operatively connected through a driving-belt 66 with the shaft 41. Said gearing comprises a counter-shaft 67, provided with fast and loose pulleys 68 and 69 and a bevel-gear 70, which meshes with a corresponding gear 71, mounted upon a drive-shaft 72, which is provided with a spur-gear 73 and engages and drives the main gear 74 of the windlass. A suitable belt-shifter (not shown) will of course be provided for throwing the belt 66 into and out of operative engagement, and the windlass will of course include a locking-dog for holding its drum against rotation.

As a further feature of improvement I provide stationary wing-dams 75 and 76, arranged at the respective sides of the main channel within which the motor mechanism is moored. Each wing-dam consists of a downwardly-converging upper end portion 77 and a straight or parallel lower end portion 78. The wing-dams 75 and 76 are made of a height coincident with the water-level of the stream when at low water, so that when the stream is low all of the water will flow between the wing-dams, and thus be to a large extent directed through the flume of the motor mechanism. Whenever the stream is higher, it will flow over the wing-dams, thus avoiding great fluctuations in the volume of water passing through the motor mechanism and at the same time preventing an excessive pressure upon the wing-dams.

The operation of the motor has been fully and clearly indicated in connection with the description of the mechanism and need not, therefore, be again repeated.

It will be seen that a motor constructed in accordance with my invention is substantially a self-contained structure and combines all of the instrumentalities necessary to meet the varying conditions of high and low water, of varying requirements of power, of utilizing practically the entire stream when the latter is low, and of automatically regulating itself to meet fluctuations in current and volume of the stream.

In Fig. 4 I have shown a modification of the wing-dam construction which directs the stream to the motor. In this instance a single wing-dam 79 is provided, consisting of three parts, which together completely cross the stream except for the raceway within which the motor is located. The upper end portion 80 of the wing-dam is made low, its upper edge being at the low-water level, while the two lower portions 81 and 82 are made high enough so as never to be overflowed except under extraordinary conditions. The two portions 80 and 81 are inclined obliquely across the channel, the upper section being somewhat more nearly transverse than the lower, while the foot end portion 82 extends substantially parallel with the bank of the channel and forms one side of the raceway 83 within which the motor is located. An ice-guard 84 is arranged to bridge the entrance to the raceway, this ice-guard being inclined downwardly and toward the center of the stream, so as to deflect the ice and other obstructions over the low part of the wing-dam. In this case the motor is anchored by means of two sets of cables, one of which is connected with a suitable support on the contiguous bank of the channel, as indicated at 85, while the other extends substantially at right angles to the raceway and is connected with a suitable support 86 at the opposite side of the channel. By means of the two anchors and acting cables the motor is moored accurately to the raceway. The advantage of this construction is of course that it lessens the cost of the wing-dam construction, dispenses with the specially-constructed midstream-anchor, and is equally effective in protecting the motor from floating ice and the like.

It will be obvious that the details of construction and arrangement may be modified without departing from the salient features of the invention, and I do not, therefore, limit myself to the details shown and described except to the extent that they are made the subject of specific claims.

I claim as my invention—

1. In a current-motor, the combination of a main frame provided with a downwardly-converging flume extending longitudinally therethrough, a water-wheel operatively mounted in the lower and narrowest part of said flume, spillway-openings in the sides of said flume laterally opposite each other and intermediate the length of the flumeway, float-chambers arranged in said main frame at each side of said flumeway and both in advance and in rear of said spillway-openings, gates pivotally mounted and arranged to control the respective spillway-openings and interconnected operating mechanism whereby said gates may be simultaneously and coequally adjusted.

2. In a current-motor, the combination of a main frame provided with a downwardly-converging flume extending longitudinally therethrough, a water-wheel operatively mounted in the lower and narrowest part of said flume, spillway-openings in the sides of said flume laterally opposite each other and intermediate the length of the flumeway, float-chambers arranged in said main frame at each side of said flumeway and both in advance and in rear of said spillway-openings, gates pivotally mounted and arranged to control the respective spillway-openings, interconnected operating mechanism whereby said gates may be simultaneously and coequally adjusted, and operative connections between said coöperating mechanism and the water-wheel whereby the gates may be operated by said water-wheel.

3. In a current-motor, the combination of a main frame provided with a downwardly-converging flume extending longitudinally therethrough, a water-wheel operatively mounted in the lower and narrowest part of said flume, spillway-openings in the sides of said flume laterally opposite each other and intermediate the length of the flumeway, float-chambers arranged in said main frame at each side of said flumeway and both in advance and in rear of said spillway-openings, gates pivotally mounted and arranged to control the respective spillway-openings, interconnected operating mechanism whereby said gates may be simultaneously and coequally adjusted, operative connections between the water-wheel and said coöperating mechanism, and an automatic governor operating to control said coöperating mechanism.

4. In a current-motor, the combination of a floating main frame, a downwardly-converging flume therein, a water-wheel operatively mounted in the lower part of said flume, spillway-openings in the sides of said flume, gates arranged to control said spillway-openings, each gate pivotally mounted upon a substantially horizontal axis, links operatively connected with the respective gates and extending toward each other and connected with a three-armed lever common to both gates, a third link operatively connected with the third arm of said lever, an automatic governor mechanism operatively connected with said third link, and operative connections between said governor mechanism and the water-wheel.

5. In combination with a floating current-motor, a wing-dam extending obliquely across the stream substantially from bank to bank and arranged to direct the water to the current-motor, one portion of said wing-dam being of a height substantially coincident with the normal water-level, and another portion laterally opposite the current-motor being made of greater height, for the purpose set forth.

6. In combination with a floating current-motor, a wing-dam extending obliquely and transversely of the stream, the lower end portion of said dam being located at a distance from one bank of the stream and being made of a height to extend above the normal water-level, and the upper end portion of said dam being made of a height approximately coincident with the normal water-level of the stream.

7. In combination with a floating current-motor, a wing-dam extending transversely and obliquely of the stream, the lower end portion of said dam extending approximately parallel with the bank and at a distance from the latter, the intermediate portion of said dam extending obliquely into the stream and at an obtuse angle with the lowermost portion, and the upper end portion extending obliquely into the stream and at an obtuse angle with the intermediate portion, said uppermost portion being of a height approximately coincident with the normal water-level and the remaining portions of the dam of a greater height, substantially as described.

GEORGE D. FOSTER.

Witnesses:
J. B. JARMIN,
ALBERT H. GRAVES.